May 12, 1953      J. E. NEEME      2,638,390

PISTON AND RING

Filed Aug. 2, 1950

Inventor

Johannes E. Neeme

By *Clarence A. O'Brien*
*and Harvey B. Jacobson*
                     Attorneys Patented May 12, 1953

2,638,390

UNITED STATES PATENT OFFICE 2,638,390

PISTON AND RING

Johannes E. Neeme, Arthur, N. Dak.

Application August 2, 1950, Serial No. 177,205

4 Claims. (Cl. 309—4)

1

This invention relates to improvements in pistons and piston rings and it is the primary object of this invention to minimize friction and wear on both cylinder walls and piston rings in an engine or a pump and to do so in a manner which greatly prolongs the life and efficiency of these parts.

Another object of this invention is to provide an improved assembly of grooves having relatively narrow counter grooves or cut backs in a piston each accommodating an expansible piston ring with an improved locking and leak-proofing feature allowing circumferential expansion but preventing lateral movement of the ends of the ring with respect to each other.

Another object of the invention is to provide a structurally simplified piston head and ring assemblage which is not only aptly suited to achieve desired ends but is one in which manufacturers and users will find their essential requirements and needs fully met, contained and effectually available.

Briefly summarized, the invention has to do with deepening the piston ring grooves through the medium of inwardly ranging countergrooves. Each countergroove functions as a channel and the latter serves to receive and trap blow-by gases and lubricating oils. By providing circumferentially spaced radial shallow canals in the bottom wall of each ring groove, these provide passages and ways and means whereby the accumulated gases and oils may seep and thus drain out from the top channel, next from the second channel and down to the third channel and so on.

Ancillary objects and features of importance will become apparent in following the description of the illustrated form of the invention.

Figure 1:
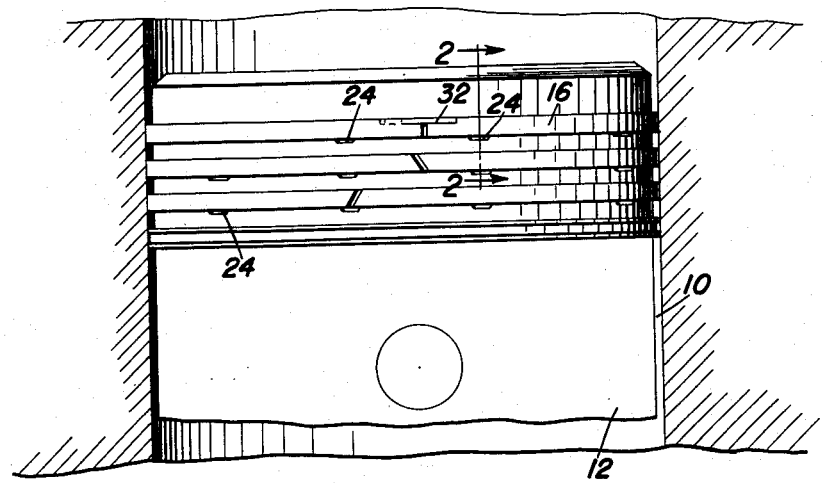
Figure 1 is an elevational view of the piston disposed in a typical cylinder having the improvement incorporated therein.
Figure 2:
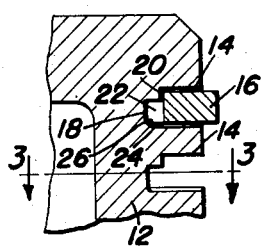
Figure 2 is an enlarged fragmentary sectional view taken substantially on the line 2—2 of Figure 1 and in the direction of the arrows.
Figure 3:
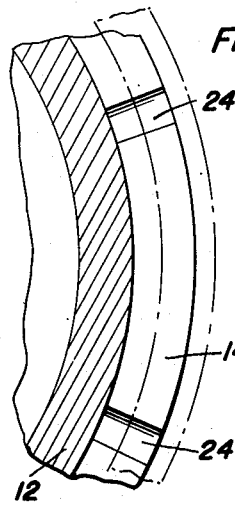
Figure 3 is a sectional view taken substantially on the line 3—3 of Figure 2 and in the direction of the arrows.

In carrying out this invention there is illustrated a typical cylinder 10 with a piston head 12 slidable therein. The piston head is provided

2 with a number of normal and conventional grooves 14 in which piston rings 16 are arranged in common fashion.

I have provided a cut-back or counter-groove 18 in the inner wall 20 of the groove 14 thereby providing a channel 22 behind the inner periphery of the ring 16. A plurality of circumferentially spaced shallow radial outlet canals or passages 24 are provided in the bottom wall 26 of the ring groove 14 and extend across the bottom wall of said oil and gas accumulating channel 22.

The piston ring 16 has a recess 30 in the upper surface thereof near one end of it. A separate plate or cleat 32 is disposed in the recess and held in place by conventional means, for example, the rivet 34. A tongue 36 extends from one edge of the plate 32 and is fitted telescopically in a slot 38 formed in the upper surface of the end 40 of the piston ring 16. The coaction of the tongue 36 in the slot 38 prevent lateral movement of one end of the ring with respect to the other end.

A land or step 42 is formed in the upper surface of the end 40 of the piston ring by means of a notch which is formed therein, the land being adapted to accommodate a part of the interlocking plate 32.

Figure 5:
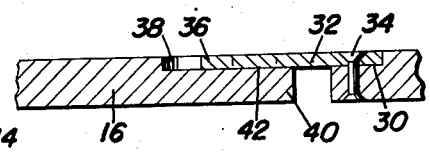
Figure 5 is a fragmentary sectional view taken substantially on the line 5—5 of Figure 4 and in the direction of the arrows.
Figure 4:
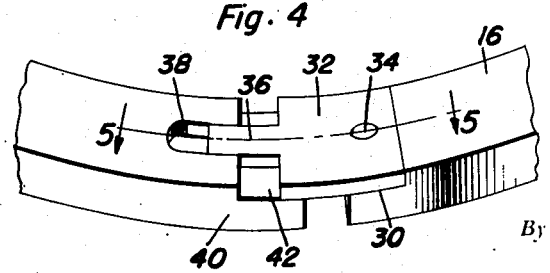
Figure 4 is a perspective view of the locking device for the piston ring.

With respect to the piston ring it will be understood that this has been expressly designed with a view toward providing an interlocking expansible and contractible leak-proof joint between the coacting ends as brought out to advantage in Figures 4 and 5. The construction is the utmost in simplicity because both ends are stepped and the cleat or plate 32 is riveted on one step and is such that it projects beyond this step and overlaps the coacting step 42. This provides an overlapping seal and the tongue and groove means 36 and 38 constitutes the locking feature which, obviously, allows the desired slip joint action while at the same time prevents lateral opening of the joint.

Since the piston embodies a leak-proof expansible and contractible joint, the blow-by gases and accompanying lubricating oil enter the accumulating and accommodating channel 22 by way of the slit or space existing between the top wall of the groove and the corresponding top wall of the piston ring. However, instead of this damaging media remaining trapped in the channel, it is drained out by way of the radial canals or passages 24 in an obvious manner and this step or action is repeated in the second channel and drainage grooves and then repeated in the third channel and drainage grooves in an obvious fashion.

This progressive or step-by-step handling of otherwise trapped pressure and lubricating oils relieves all of the piston rings of undue radially expanding pressure and by thus reducing friction between the outer peripheral surfaces of the rings and the coacting surface of the cylinder bore which is wiped by the rings, friction and wear is reduced and the longevity of all coacting parts is appreciably increased.

It will be evident that the structural means herein revealed reduces undue wear of sliding surfaces, avoids weakening of the web portions which separate the respective ring grooves on the piston head and relieves the inner peripheral surfaces of the compression rings from undesirable pressure. Also, and by reason of the radial canals on the floor or bottom wall of each groove, more effective lubrication of said bottom surfaces, both ring and groove, is assured. With the construction disclosed an increase of mechanical efficiency results in lower field consumption and an increase of power and the over-all construction is such that extensive alterations in the existing piston head and piston ring construction is avoided.

Minor changes in shape, size, materials and rearrangement of parts may be resorted to in actual practice provided no departure is made from the invention as claimed.

Having described the invention, what is claimed as new is:

1. In combination, a piston having a packing ring groove, a packing ring mounted in said groove, said groove having a wall defining the innermost limits thereof, means forming a channel in said wall extending inwardly of the inner periphery of said ring, and a plurality of upwardly opening drainage canals formed in the lowermost wall of said groove and below the bottom surface of said ring.

2. In combination, a piston head having compression ring grooves, said grooves being provided with inwardly disposed counter-grooves, said counter-grooves being narrower than the first named grooves and constituting channels, the corresponding bottom walls of the respective grooves and channels having circumferentially spaced radial shallow pressures relief and drainage canals, said canals opening through the outer portions of the respective grooves, and piston rings fitted in the respective grooves, said piston rings corresponding in cross-section to the cross-section of the main ring grooves and said channels being disposed inwardly of the inner peripheral surfaces of said rings, each of the rings being of split expansible and contractible construction and having their ends interconnected by leak-proof joints.

3. A piston having a head, said head having a plurality of compression ring grooves, each ring groove having its inner portion counter-grooved and each counter-groove being of appreciably smaller cross-section than the main groove, the bottom walls of the main and counter-grooves having radial circumferentially spaced shallow depressions constituting oil and pressure discharging canals.

4. For use on and in conjunction with a piston head which is equipped with at least one piston ring groove whose inner portion is counter-grooved with the bottom walls of the main and counter-grooves having radial circumferentially spaced shallow depressions which serve as oil and pressure discharging canals; a piston ring adapted to be fitted in the aforementioned ring groove, said ring being resilient and having separated ends, one end having a step and an associated tongue receiving groove which coacts with the step, the other end having a similar step, and a cleat mounted on said last named step and projecting beyond the same and slidably overlapping the first named step and having a projecting tongue fitting slidably into said tongue receiving groove.

JOHANNES E. NEEME.

References Cited in the file of this patent

UNITED STATES PATENTS

| Number | Name | Date |
|---|---|---|
| 1,304,360 | Norwood | May 20, 1919 |
| 1,369,362 | Seifert | Feb. 22, 1921 |
| 1,512,393 | Behnke | Oct. 21, 1924 |
| 1,868,744 | Grant | July 26, 1932 |
| 1,988,727 | Godron | Jan. 22, 1935 |
| 2,273,703 | Gille | Feb. 17, 1942 |
| 2,485,862 | Caza | Oct. 25, 1949 |

FOREIGN PATENTS

| Number | Country | Date |
|---|---|---|
| 713,067 | France | Aug. 10, 1931 |
| 407,547 | Great Britain | Mar. 22, 1934 |